United States Patent [19]

Watanabe et al.

[11] Patent Number: 5,086,737
[45] Date of Patent: Feb. 11, 1992

[54] FUEL INJECTION TIMING CONTROL SYSTEM FOR AN INTERNAL COMBUSTION ENGINE WITH A DIRECT FUEL INJECTION SYSTEM

[75] Inventors: Hideo Watanabe, Tokyo; Koji Morikawa, Musashino, both of Japan

[73] Assignee: Fuji Jukogyo Kabushiki Kaisha, Tokyo, Japan

[21] Appl. No.: 534,717

[22] Filed: Jun. 7, 1990

[30] Foreign Application Priority Data

Jun. 29, 1989 [JP] Japan .................. 1-168937
Jun. 29, 1989 [JP] Japan .................. 1-168940

[51] Int. Cl.$^5$ .................................. F02D 41/34
[52] U.S. Cl. .................. 123/295; 123/73 C; 123/305
[58] Field of Search .......... 123/33 C, 294, 295, 123/301, 305, 430, 478

[56] References Cited

U.S. PATENT DOCUMENTS

| | | | |
|---|---|---|---|
| 2,411,740 | 11/1946 | Malin | 123/295 |
| 3,315,650 | 4/1967 | Bishop et al. | 123/279 X |
| 3,892,207 | 7/1975 | Weise | 123/305 |
| 4,069,794 | 1/1978 | Jordan | 123/301 X |
| 4,480,620 | 11/1984 | Tange et al. | 123/295 X |
| 4,920,937 | 5/1990 | Sasaki et al. | 123/305 |
| 4,949,689 | 8/1990 | Schlunke | 123/295 |

FOREIGN PATENT DOCUMENTS 60-501963 11/1985 Japan .
62-32214 2/1987 Japan .

Primary Examiner—Tony M. Argenbright
Attorney, Agent, or Firm—Martin A. Farber

[57] ABSTRACT

A combustion chamber of an engine has a fuel injector provided for injecting fuel directly in the combustion chamber. A fuel injector and a gap of a spark plug are located on the axis of the cylinder of the engine. A fuel injection finishing crank angle is set at an angle to advance an ignition timing in accordance with an arrival time of a fuel spray at the tap, and a fuel injection starting angle with respect to the fuel injection finishing angle is set in accordance with a quantity of the injected fuel.

5 Claims, 12 Drawing Sheets

FIG. 2a  FIG. 2b
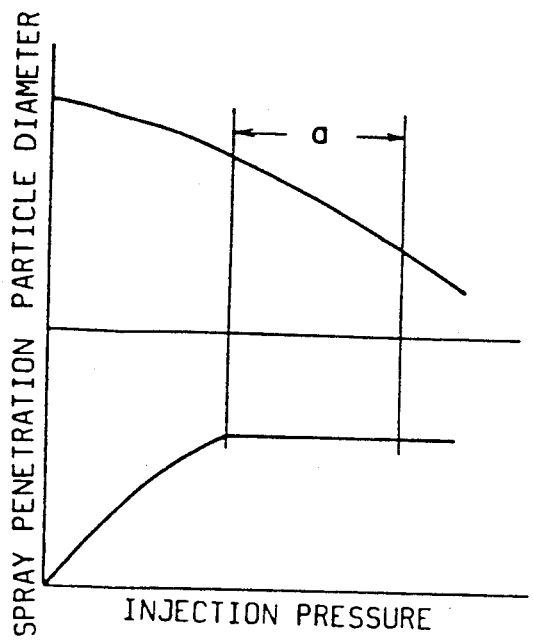
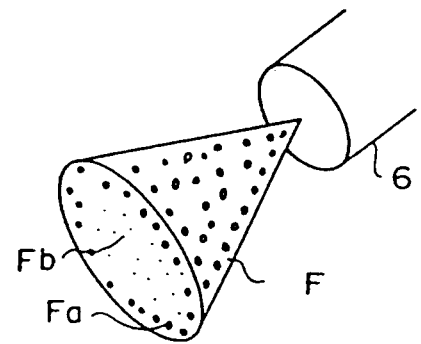
FIG. 3
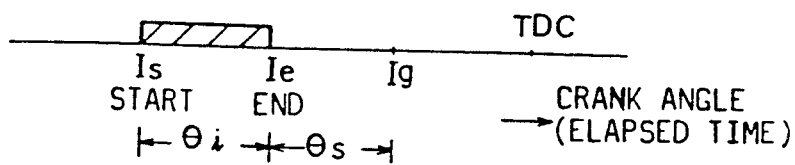

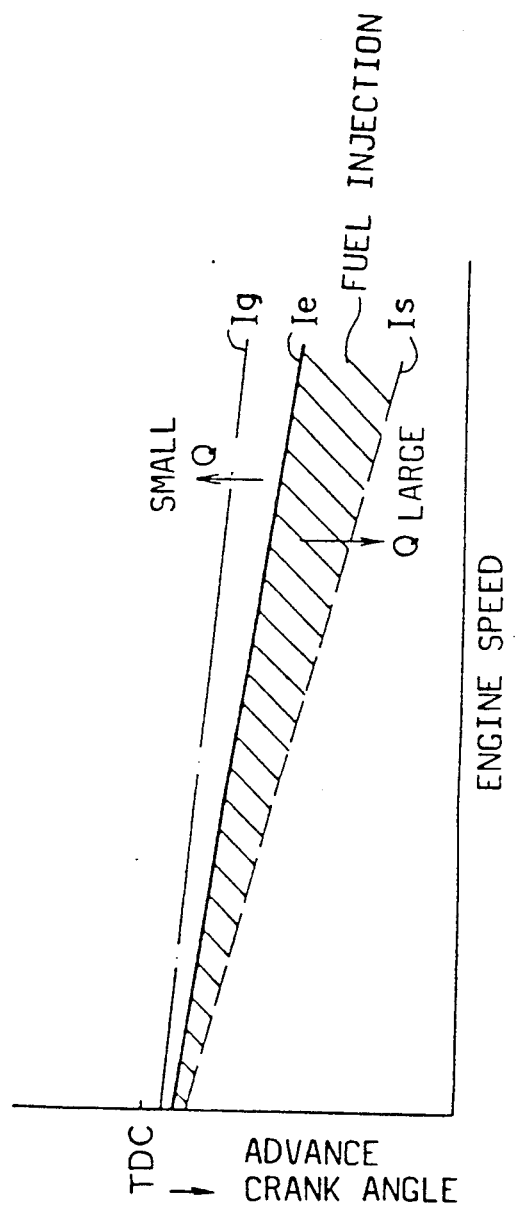

FUEL INJECTION TIMING CONTROL SYSTEM FOR AN INTERNAL COMBUSTION ENGINE WITH A DIRECT FUEL INJECTION SYSTEM

BACKGROUND OF THE INVENTION

The present invention relates to a system for controlling injection timing of fuel for an internal combustion engine with a direct fuel injection system, and more particularly to the system for promoting stratified combustion.

In the direct fuel injection system, a rich air-fuel mixture is injected from an injector near a spark plug while dispersion of the fuel is suppressed. The mixture is ignited with the spark plug and continuously burned with flame propagation to achieve the stratified combustion.

In order to improve scavenging efficiency in a light engine load range of a two-cycle engine and to prevent the fuel from escaping through an exhaust port, the direct fuel injection system has been proposed. In the system, air is only induced into the cylinder by a scavenge pump through a scavenge port and the fuel is directly injected to the cylinder by a fuel injector after closing the scavenge port. In such a system, the fuel injector and a spark plug are disposed in a combustion chamber of the cylinder.

In a four-cycle engine, the engine load is controlled by controlling the quantity of the fuel from the injector, thereby reducing throttle loss of induced air. Thus, the air-fuel ratio becomes lean to improve thermal efficiency and fuel consumption. Therefore, it is desirable to achieve the stratified combustion in a wide operational range of the engine. However, if the mixture is burned in a stratified mode in a heavy engine load range, the air can not be sufficiently used and hence large engine power can not be produced. Therefore, it is necessary to immediately change the combustion to a homogeneous mixture combustion.

In order to ensure a smooth transfer of the combustion between the stratified charge and the homogeneous mixture, it is necessary to properly determine arrangements of the injector, the spark plug and the gap of the plug, flow of injected fuel, fuel injection rate, and the fuel injection timing corresponding to the ignition timing. The fuel is injected from the injector in a period from closing the exhaust valve to ignition. The period is long in the four-cycle engine compared with that of the two-cycle engine. In any engine, it is necessary to inject the fuel immediately before the ignition in order to achieve the stratified combustion. Since the ignition timing and the fuel injection quantity vary in accordance with engine operating conditions, it is desirable to properly control the starting time and the finishing time of the fuel injection.

Japanese Patent Application Laid-Open 62-32214 discloses such a two-cycle engine. The two-cycle engine has a spherical cavity formed in a roof of a combustion chamber, positioned eccentrically with respect to an axis of the cylinder. The cavity is effective to promote turbulence of fresh air in a vertical direction to form a vertical swirl. Injected fuel is mixed with turbulent air, which is carried toward a spark plug. A fuel injector and a spark plug are provided on a top of the cavity.

In the system, it is evident by measuring flow in the cavity with a laser doppler anemometer that a cycle of the swirl greatly fluctuates in accordance with engine operating conditions. Accordingly it is difficult to stably ignite the fuel in any engine operating condition. In a heavy engine load range, the fuel is not equally dispersed due to the swirl so that the homogeneous mixture combustion is not obtained. Consequently, large engine power in the heavy load range can not be expected.

Japanese Patent Application Laid-Open 60-501963 discloses a direct fuel injection system where the fuel is injected in the cylinder at 5 to 7 $kg/cm^2$ of injection pressure.

In the direct fuel injection system, the fuel is injected after the exhaust port is closed in a compression stroke Since the pressure in the cylinder is high in a late stage of the compression stroke, the fuel can not be injected into the cylinder. Consequently, it is difficult to set the fuel injection time at a proper time in accordance with the engine operating conditions. As a result, the ignition and fuel injection are inevitably set at earlier times. In particular, the fuel injection timing for providing the stratified charge is not properly controlled.

SUMMARY OF THE INVENTION

An object of the present invention is to provide a direct fuel combustion control system for an engine in which timing and duration of fuel injection are controlled in accordance with engine operating conditions.

According to the present invention, there is provided a fuel injection timing control system for an engine having at least one cylinder, which has a fuel injector provided for injecting fuel directly in the cylinder, and a spark plug.

The other objects and features of this invention will become understood from the following description with reference to the accompanying drawings.

BRIEF DESCRIPTION OF THE DRAWINGS

FIG. 2a is a graph showing characteristics of a fuel injector;

FIG. 2b is a schematic perspective view of a fuel spray;

FIG. 3 is a diagram showing a fuel injection timing;

FIG. 6 is a graph showing the injection of fuel;

DETAILED DESCRIPTION OF THE PREFERRED EMBODIMENTS

Figure 1A:
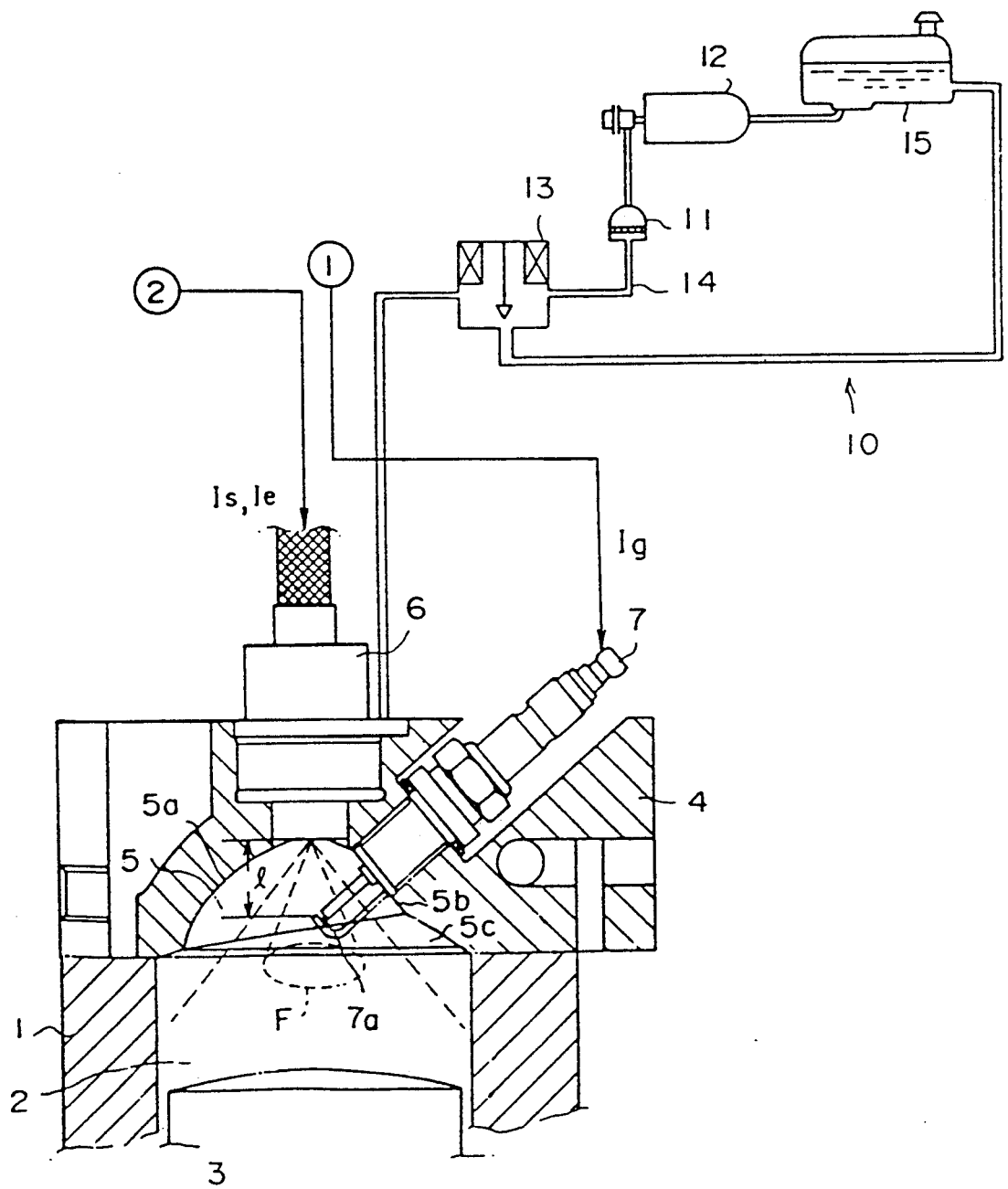
FIGS. 1a and 1b are a schematic diagrams showing a fuel injection timing control system for a two-cycle engine according to the present invention.

Referring to FIG. 1a, a two-cycle engine 1 comprises a cylinder 2, a piston 3 provided in the cylinder 2, and a combustion chamber 5 formed in a cylinder head 4 and an upper portion of the cylinder 2.

The combustion chamber 5 has an arc-shaped cavity 5a on a roof thereof located offset from an axis of the cylinder 2 and a plug mounting portion 5b formed on the roof of the chamber 5. The arc-shaped cavity 5a is connected to a squish zone 5c through the plug mounting portion 5b.

A fuel injector 6 is provided on the top of the combustion chamber 5 near the axis of the cylinder 2 and directed toward a center of the combustion chamber 5. A spark plug 7 is provided on the plug mounting portion 5b of the cavity 5a and inclined with respect to its the axis. The spark plug 7 is located so as to position a gap 7a at a predetermined distance from the injector 6 in a fuel injection direction and to project into the cavity 5a so as not to be affected by a swirl of air in the cylinder 2.

Fuel in a fuel tank 15 of a fuel supply system 10 is supplied to the injector 6 through a fuel passage 14 having a pump 12, a filter 11 and a pressure regulator 13 for maintaining the fuel at a predetermined pressure. A control unit 20 (FIG. 1b) generates and sends a fuel injection quantity signal and an injection timing signal to the injector 6 for injecting the fuel and an ignition timing signal to a spark plug 7 for igniting the spark plug 7.

The injector 6 is a type having an electromagnetic single-hole nozzle, and an injection angle $\alpha$ of a fuel spray is preferable between 40 and 80 degrees.

Referring to FIG. 2a showing characteristics of a diameter of particles and penetration force of the injected fuel corresponding to injection pressure of the engine. If the injection pressure is between 30 and 100 $kg/cm^2$ within an optimum using range a, the penetration force becomes constant and the power of injection is used for pulverization of the fuel, so that the diameter of the particles reaches such a small value as an average diameter of 10 $\mu$m.

Referring to FIG. 2b, a fuel spray F has a conical shape. The diameter of the particles in an outer peripheral portion Fa of the spray F is a large diameter and the fuel density of the portion is high. However, the large particle is sheared by the air, thereby becoming fine particles. Thus, the fuel in the portion is in an easily ignitable condition. An inside portion Fb of the spray F has low density and includes the particles of a small diameter, so that the fuel in the portion is also in an ignitable state. In this case, the rate of fuel injection (quantity of the fuel injected per unit time) is determined to be a predetermined constant value.

The distance between the injector 6 and the gap 7a should be determined to be a proper value. If the distance is short, the velocity of the fuel spray F at the gap 7a is high. Consequently, the fuel is not yet sufficiently mixed with the air so that the fuel is hardly ignited by the spark plug 7. If the distance is long, the fuel spray is largely diffused so that the mixture becomes lean. This causes difficulty in ignition. In addition, the fuel mixture is disturbed by the swirl. Accordingly, the gap 7a is located at a distance l from the injector 6 between a first distance l1 and a second distance l2. At the first distance l1 for example, 15 mm, the velocity of the spray F becomes a predetermined speed lower than the initial speed. At the second distance l2 for example 30 mm, a predetermined diffusion of the spray is obtained.

Referring back to FIG. 1b, an accelerator pedal depressing degree sensor 16 and a crank angle sensor 17 are provided for determining engine operating conditions. An output signal of the accelerator pedal depressing degree sensor 16 is applied to an engine load detector 21 of the control unit 20 where engine load Q is detected. An output signal of the crank angle sensor 17 is applied to an engine speed detector 22 and a crank angle detector 23 in which an engine speed N and a crank angle $\theta$ are detected, respectively. These signals Q, N and $\theta$ are applied to an ignition timing determining section 24 where an ignition crank angle Ig is derived from a lookup table arranged in an ignition timing table 25 corresponding to the engine operating conditions in accordance with the engine load Q and the engine speed N. An ignition signal is fed to the spark plug 7 through a driver 26.

The control unit 20 is further provided with a fuel injection pulse width providing section 27 to which the engine load Q and the engine speed N are applied. In the section 27, a basic fuel injection quantity is calculated corresponding to the engine operating conditions based on the engine load Q and the engine speed N. The calculated basic fuel injection quantity is corrected by various correcting values to produce a desired fuel injection quantity. A fuel injection pulse width Ti is determined in accordance with the calculated fuel quantity. The engine speed N, the crank angle $\theta$, the ignition angle Ig, and the fuel injection pulse width Ti are fed to a fuel injection timing determining section 28 where a starting crank angle Is and a fuel injection finishing crank angle Ie for injecting the fuel are calculated to produce a fuel injection timing signal. The fuel injection timing signal is fed to the injector 6 through a driver 29.

For example, the distance l between the injector 6 and the gap 7a is determined as 20 mm. The velocity of the fuel spray Vf is a function of an injection pressure Pf and an intake pressure p. If a high pressure injector is used, the velocity of the spray Vf is about 50 ms. Thus, an arrival time Ts of the fuel spray Vf at the gap 7a with respect to the top dead center of the piston stroke is calculated as follows.

$$Ts = (l/Vf) - Tr$$

where Tr is an injector operation time lag. A crank angle $\theta$s corresponding to the time Ts (ms) relative to the engine speed N (rev/min) is calculated from an equation as follows.

$$\theta s = Ts \cdot N \cdot 360/60000$$

Similarly, a crank angle $\theta$i corresponding to the pulse width Ti is calculated.

As shown in FIG. 3, if the fuel injection finishing crank angle Ie is set at an angle advanced from (preceding) from the ignition angle Ig by the angle $\theta$s, the fuel is ignited when a later part of the spray F reaches the gap 7a. The fuel injection starting angle Is is determined by advancing the angle $\theta$i from the finishing angle Ie.

Thus, the fuel injection starting crank angle Is is calculated as follows.

$$Is = Ig - (\theta s + \theta i)$$

The operation of the two-cycle engine is described hereinafter with reference to FIGS. 4a to 6.

When the piston 3 descends to open an exhaust port (not shown), a part of the burned gases is discharged from the exhaust port. When scavenge ports (not shown) open, pressurized scavenge air is delivered into the cylinder 2 through the scavenge ports in opposite directions. The scavenge air is upwardly turned by the wall of the cylinder 2 and inverted by the wall of the cavity 5a to form the vertical swirl S. The swirl flows to the portion 5b and the squish zone 5c without influencing the gap 7a. Consequently, burned gases in the cylinder 2 are scavenged so that fresh intake air is admitted therein with vertical swirling.

During the upward stroke, the piston 3 goes up to close the scavenge and exhaust ports. A small amount of the fuel is injected from the injector 6 after the exhaust port closes.

During the operation of the engine, the fuel regulated by the pressure regulator 13 of the fuel supply system 10 is supplied to the injector 6.

Describing the operation of the control unit 20, output signals of the accelerator pedal depressing degree sensor 16 and the crank angle sensor 17 are supplied to the control unit 20. The engine speed N and the engine load Q are applied to the fuel injection pulse width providing section 27 where the fuel injection pulse width Ti is provided in accordance with the engine operating conditions. The engine speed N, the engine load Q, and the crank angle $\theta$ are fed to the ignition timing determining section 24. The ignition angle Ig is properly determined so as to prevent the engine from knocking at heavy engine load. The ignition angle Ig, the fuel pulse width Ti, the engine speed N and the crank angle $\theta$ are fed to the fuel injection determining section 28. The fuel injection starting angle Is and the finishing angle Ie are calculated in accordance with the flowchart of FIG. 5.

Figure 4A:
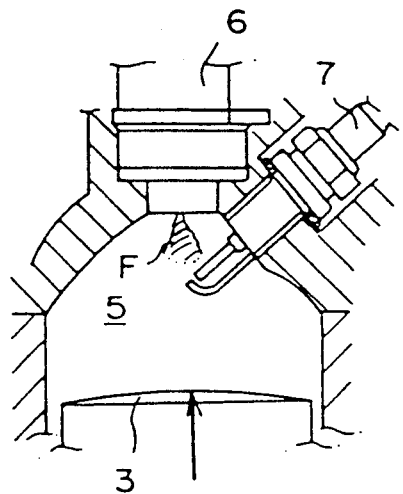
FIGS. 4a to 4d are schematic diagrams explaining formations of combustible mixture in light and middle load ranges of the engine.
Figure 4B:
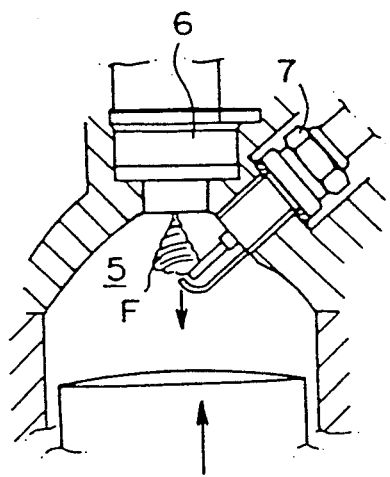
Figure 4C:
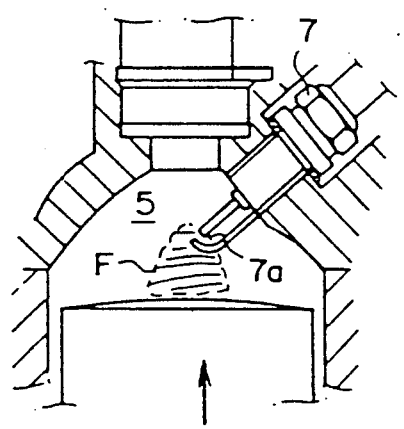
Figure 4D:
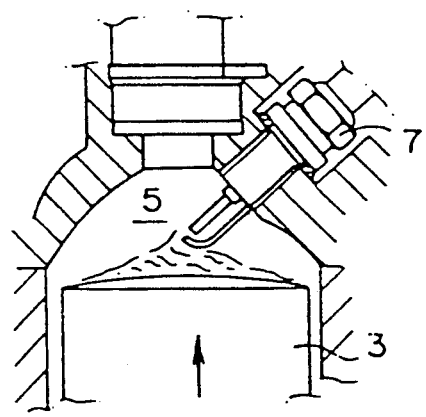
Figure 5:
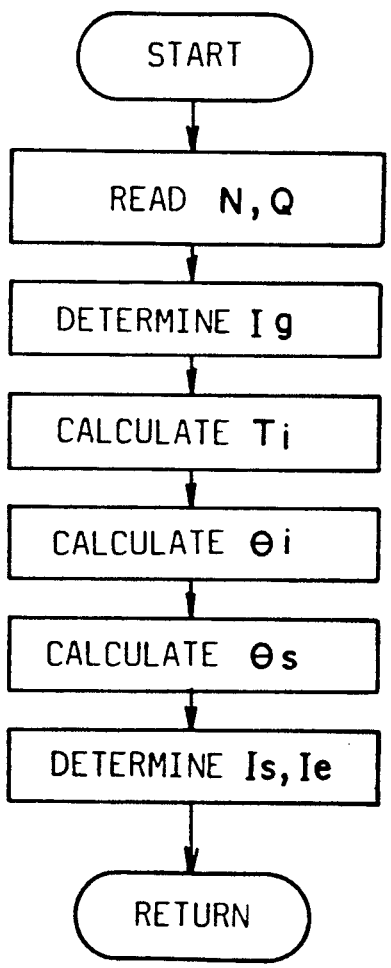
FIG. 5 is a flowchart for calculating the fuel injection timing.

In light and middle engine load ranges, a small quantity of the fuel is injected from the injector 6 at the starting angle Is as shown in FIG. 4a. As shown in FIG. 4b, a small quantity of the conical-shaped fuel spray F is dispersed by mixing with the air for atomization, reducing the density of the fuel spray F. At that time, since the injection pressure and the initial speed of the fuel spray F are high, the fuel spray F is not greatly affected by the vertical swirl S. At the finishing angle Ie, the fuel injection is stopped. After the time corresponding to the crank angle $\theta s$ has elapsed, the fuel spray F reaches the gap 7a of the spark plug 7 as shown in FIG. 4c. In this state, the early part of the spray F is properly disposed. Thus, the fuel is reliably ignited by the spark plug 7. As shown in FIG. 4d, a flame is propagated from a portion in front of the gap 7a in a stratified combustion mode.

In the system, the fuel injection is controlled in accordance with the starting angle Is and the finishing angle Ie in relation to the ignition angle Ig. When the ignition angle Ig is advanced in accordance with an increase of the engine speed N, the starting angle Is and finishing angle Ie are advanced as shown in FIG. 6. The starting angle Is and the finishing angle Ie are controlled in accordance with the engine speed N corresponding to the engine load Q.

In the heavy engine load range, since a large quantity of fuel F is injected, the starting angle Is is set near the bottom dead center position. The fuel injection starts immediately after closing the exhaust port. The fuel is widely dispersed in the cylinder 2 as a result of a sufficient penetration of the fuel spray F. The fuel is further mixed with the air during the compression stroke to produce a homogeneous mixture.

Figure 7A:
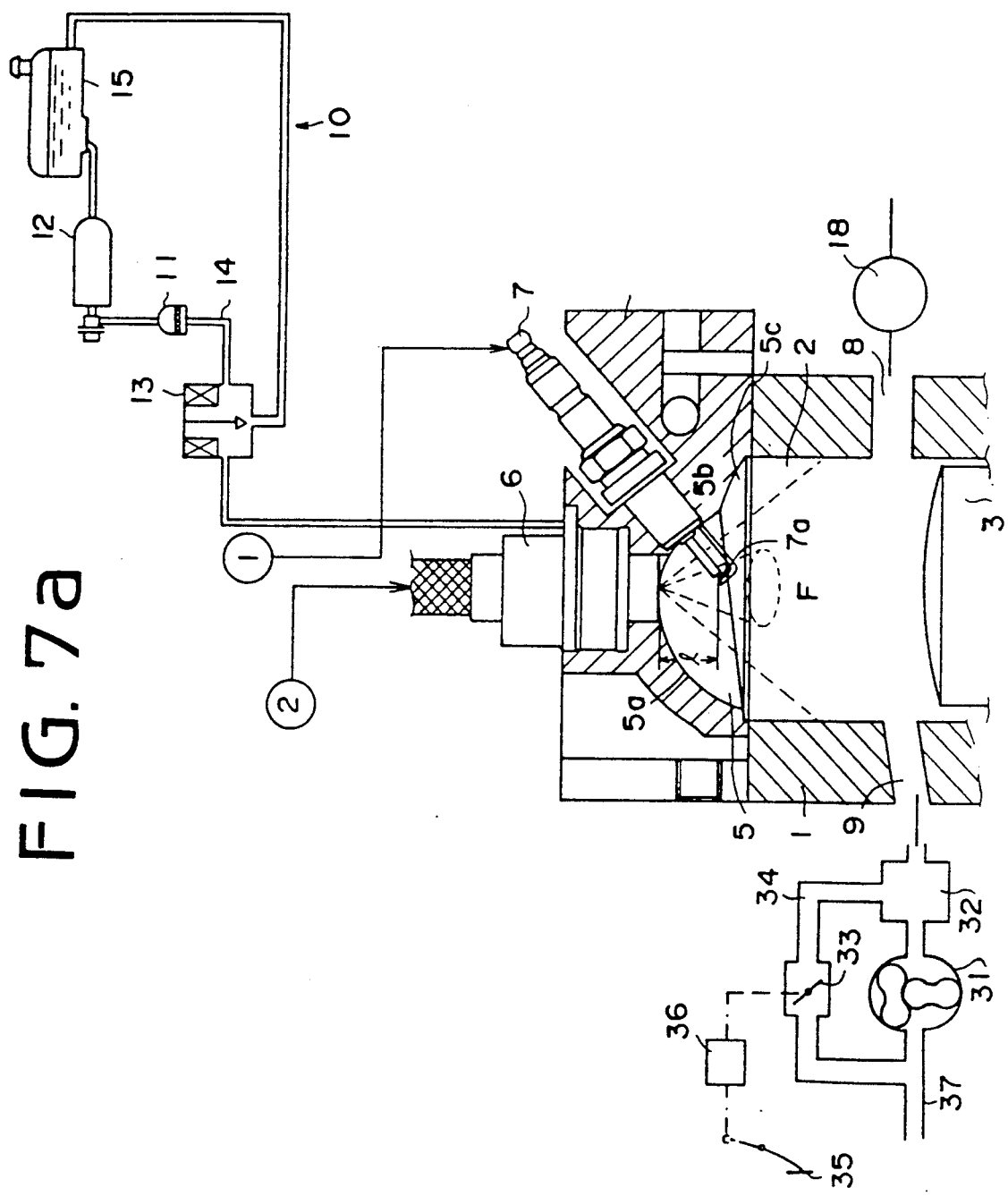
FIGS. 7a and 7b are schematic diagrams showing a system of a second embodiment of the present invention.
Figure 7B:
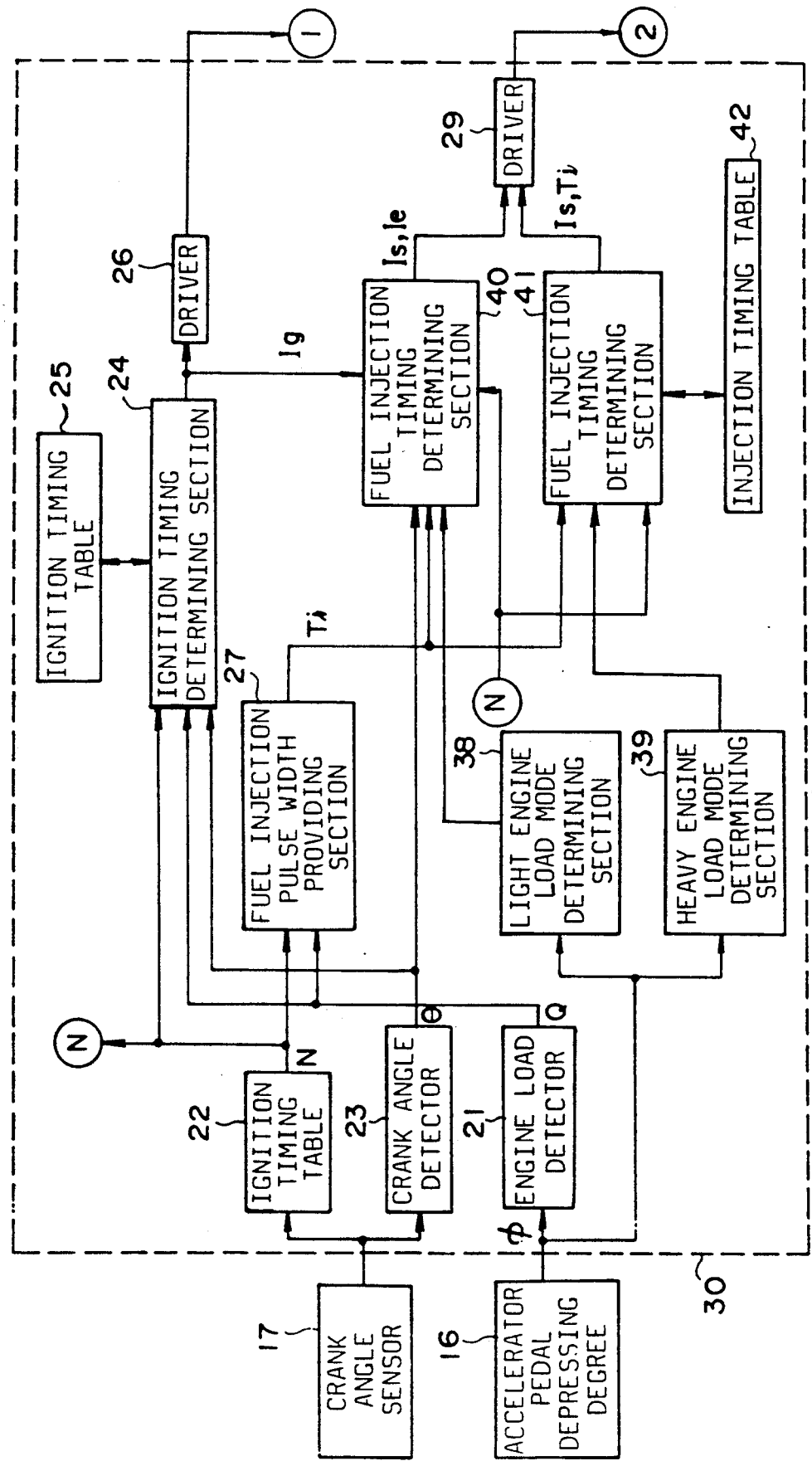

Referring to FIGS. 7a and 7b showing the second embodiment of the present invention, in the wall of the cylinder 2, an exhaust port 8 is formed and a plurality of scavenge ports 9 are formed opposite to and at lower positions than those of the exhaust port 8.

The engine 1 is supplied with the air through a scavenge pump 31, an intake pipe 37 having a scavenge chamber 32 for absorbing scavenge pressure waves when the scavenge port 9 is opened or closed. A bypass 34 is provided around the scavenge pump 31. The bypass 34 is provided with a control valve 33. The scavenge pump 31 is driven by a crankshaft of the engine through a transmitting device for producing a scavenge pressure. An accelerator pedal 35 is operatively connected with the control valve 33 through a valve controller 36.

Figure 8B:
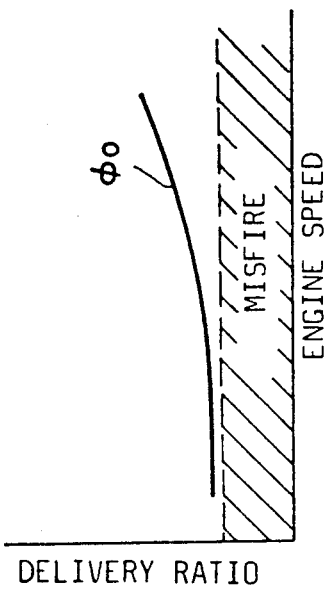
FIG. 8b is a graph showing characteristics of an air-fuel ratio.
Figure 8C:
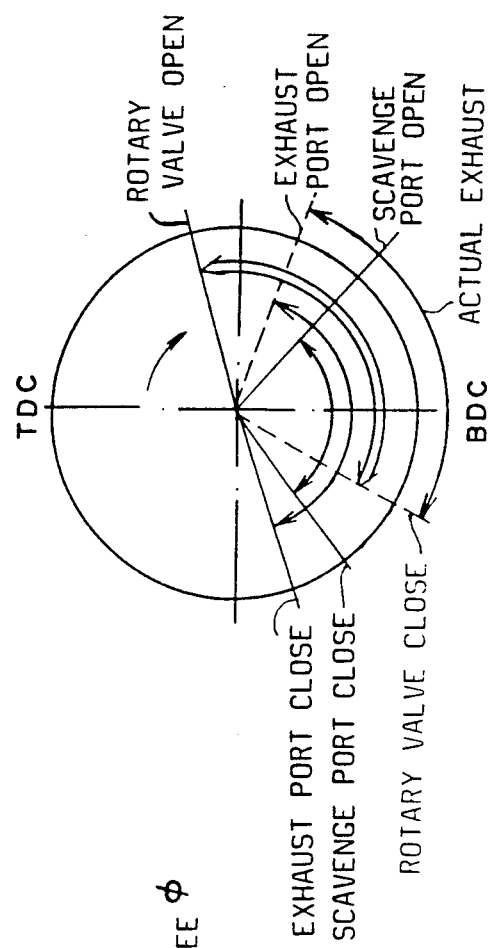
FIG. 8c is a time chart showing characteristics of a rotary control valve movement.
Figure 8A:
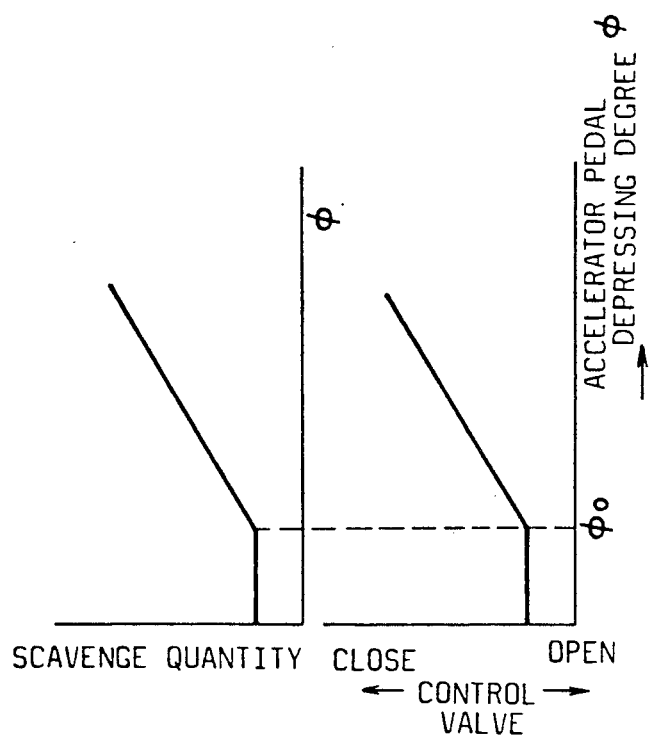
FIG. 8a are graphs showing characteristics of quantity of scavenge air and an opening degree of a control valve corresponding to a depression degree of an accelerator pedal.

Referring to FIG. 8a, when the depressing degree $\phi$ of the accelerator pedal 35 is smaller than a predetermined value $\phi_0$, the opening degree of the control valve 33 is maintained constant. When the depressing degree $\phi$ is larger than the value $\phi_0$, the control valve 33 is gradually closed by the controller 36 with an increase of the depressing degree $\phi$. Thus, the quantity of the scavenging air is increased from the constant value with an increase of the depressing degree $\phi$. As shown in FIG. 8b, the quantity of the scavenging air as well as the value $\phi_0$ is determined so as to provide a predetermined air-fuel ratio, thereby preventing misfire caused by an excess of the exhaust gas in the entire engine operating range.

The exhaust gas of the engine 1 is discharged through the exhaust port 8. A rotary exhaust valve 18 is provided in the exhaust port 8.

As shown in FIG. 8c, the exhaust port 8 opens and closes symmetrically with respect to each other with respect to the bottom dead center (BDC). In the same way, the scavenge port 9 also symmetrically opens and closes alternatively, so that a smaller angle is formed than that of the exhaust port 8. The rotary valve 18 is adapted to open and close before the exhaust port 8 opens and closes. Since the actual exhaust stroke is performed when the exhaust port 8 opens and the rotary exhaust valve 18 closes, an allowable range of the fuel injection is increased.

Other parts are the same as in the first embodiment and the same references as FIG. 1 designate the same parts as FIG. 1a.

Describing the operation of the system with reference to FIGS. 7a and 7b, a control unit 30 of the second embodiment determines the ignition angle Ig in the same manner as the control unit 20 of the first embodiment.

The control unit 30 is further provided with a light engine load mode determining section 38 and a heavy engine load mode determining section 39 which are supplied with the accelerator pedal depressing degree $\phi$. The light engine load mode determining section 38 determines a light engine load mode when $\phi < \phi_0$. The heavy engine load mode determining section 39 determines a heavy engine load mode when $\phi \geq \phi_0$. A light engine load mode signal from the section 38 is fed to a fuel injection timing determining section 40 and a heavy engine load mode signal from the section 39 is fed to a fuel injection timing determining section 41.

Figure 1B:
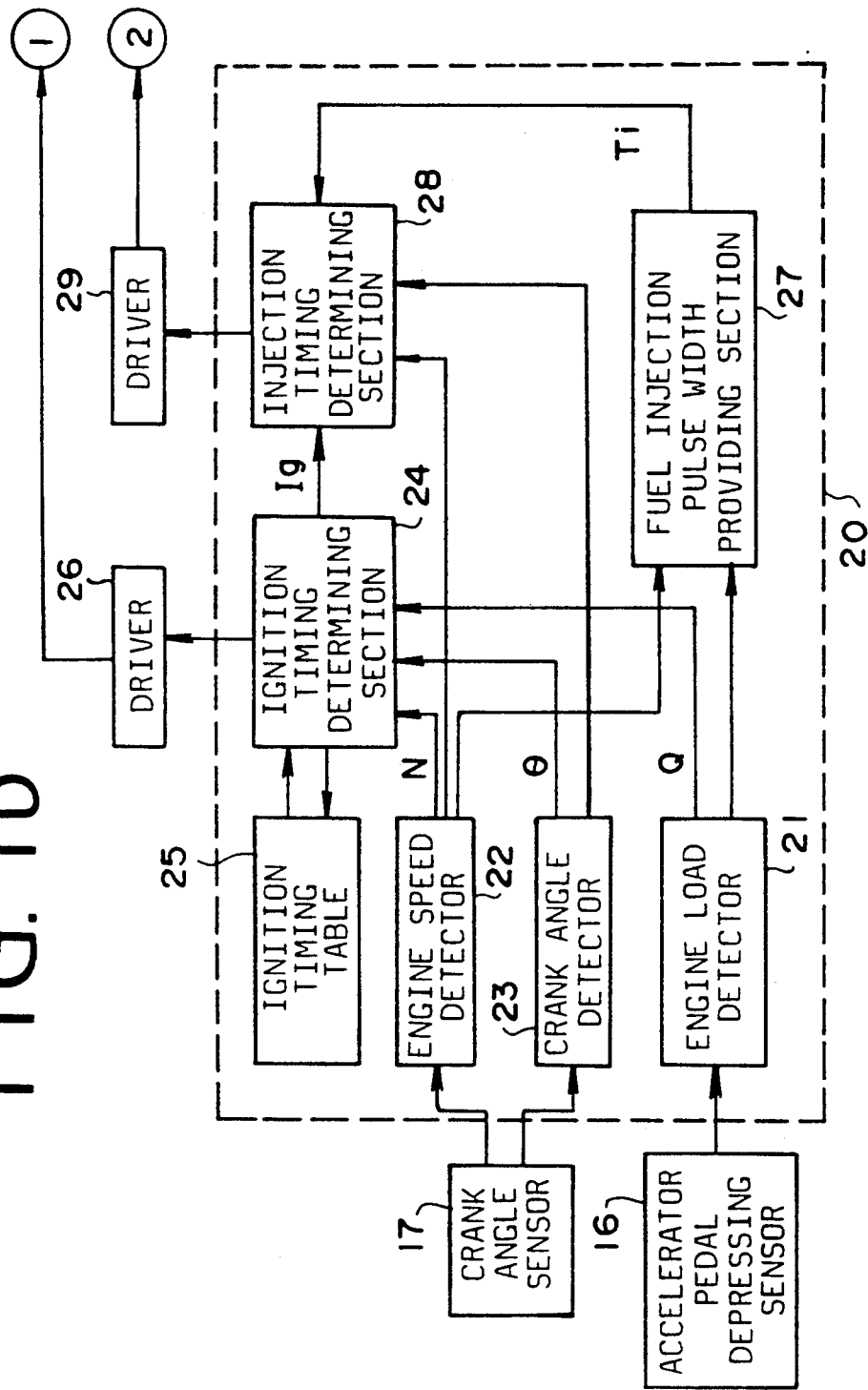

The other parts of the control unit 30 are the same as the control unit 20 of the first embodiment and identified with the same reference numerals as FIGS. 1a and 1b.

The fuel injection timing determining section 40 is provided to determine the injection timing for controlling the engine load by a stratified charge in a light engine load. Namely, the engine speed N, the crank angle $\theta$, the ignition angle Ig, and the fuel injection pulse width Ti are fed to the fuel injection timing determining section 40 where the starting angle Is and the finishing angle Ie for injecting the fuel are calculated. The arrival time Ts of the fuel spray Vf to the gap 7a is calculated in accordance with the distance l and the velocity of the fuel spray Vf. A crank angle $\theta$s corresponding to the arrival time Ts (ms) is calculated. Similarly, a crank angle $\theta$i corresponding to the pulse width Ti is calculated.

Figure 9A:
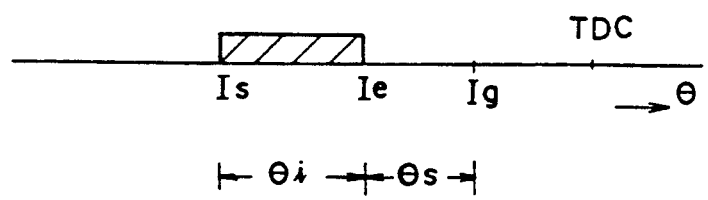
FIG. 9a and 9b are diagrams showing fuel injection timing.

As shown in FIG. 9a, if the fuel injection finishing angle Ie is determined by advancing the angle $\theta$s from the ignition angle Ig, the fuel is ignited when the later part of the spray F reaches the gap 7a. The fuel injection starting angle Is is determined by advancing the angle $\theta$i from the finishing angle Ie. Thus, the fuel injection starting angle Is is calculated as follows.

$$Is = Ig - (\theta s + \theta i)$$

Figure 9B:
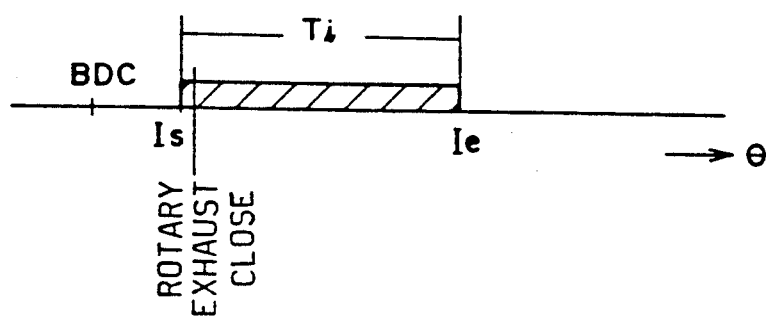

The fuel injection timing determining section 41 is provided for controlling the engine load by homogeneous mixture combustion in the middle and heavy engine loads. The fuel injection timing determining section 41 determines the starting angle Is for injecting the fuel corresponding to the closing of the rotary exhaust valve 18 so as to prevent the fuel from escaping. The fuel is dispersed as soon as possible to provide the homogeneous mixture so that the engine operation in the middle or heavy load range is controlled. In fact, since the fuel spray F reaches the exhaust port 8 with a slight lag, the starting time can be set to the early stage by the lag. The fuel injection start angle Is is derived from a fuel injection time table 42. The starting angle Is is determined immediately before the rotary exhaust valve 18 starts to close as shown in FIG. 9b and advanced corresponding to the engine speed N. Fuel injection timing signals from sections 40 and 41 are supplied to the injector 6 through the driver 29.

The operation of the system will be described hereinafter with reference to FIGS. 10 and 11.

In operation, as shown in FIG. 8c, when the piston 3 descends in the combustion and exhaust strokes, the rotary valve 18 opens. When the exhaust port 8 opens, a part of the residual burned gas is flushed out, forced by the pressure in the cylinder 2. As the scavenge port 9 opens, fresh air, the quantity of which depends on the position of the accelerator pedal 35, is delivered by the pump 31. A part of the air is returned to the inlet side of the scavenge pump 31 through the control valve 33 and the bypass 34 so that the air flows into the cylinder 2 for scavenging without causing pumping loss.

As the piston 3 starts to go up, from the bottom dead center in the intake and compression strokes, the rotary valve 18 closes to stop discharging. The fresh air is charged in the cylinder and when the scavenge port 9 is closed, the compression stroke starts.

Figure 10:
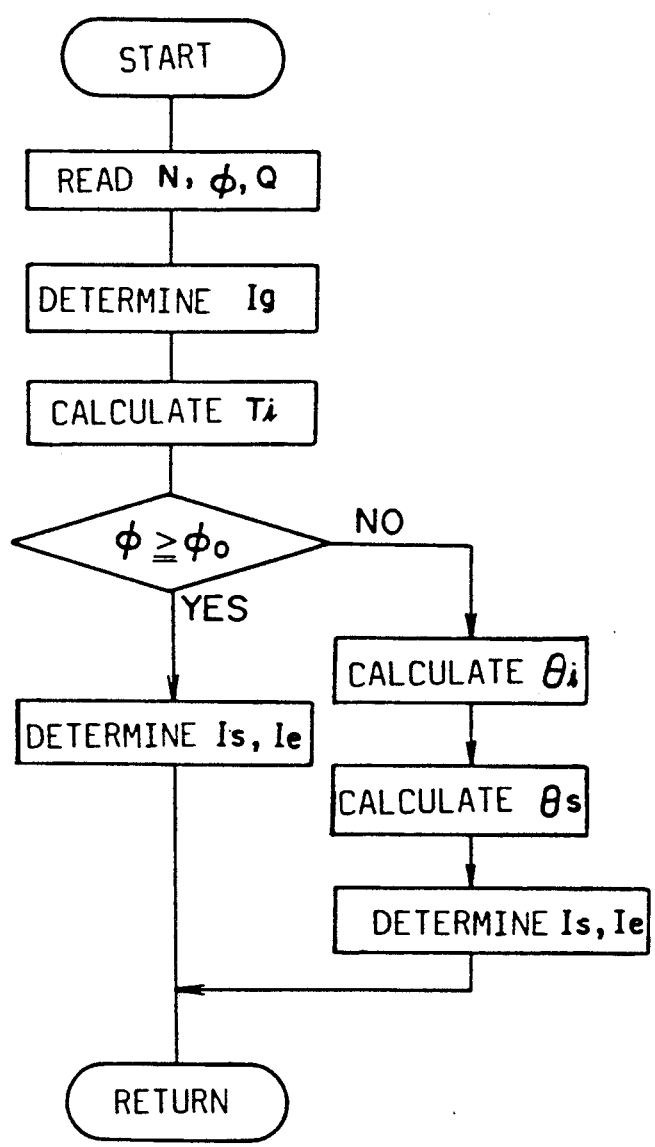
FIG. 10 is a flowchart for the fuel injection timing.

In the control unit 30, the operation for controlling the fuel injection timing is performed in accordance with the flowchart of FIG. 10.

When $\phi < \phi_0$, the light engine load mode is determined in the light engine load mode determining section 38. The fuel injection timing is controlled in the section 40. The opening degree of the control valve 33 and the quantity of the scavenge air is maintained constant so that the swirl is stably formed. Thus, the engine load is controlled in accordance with the fuel injection quantity.

Figure 11A:
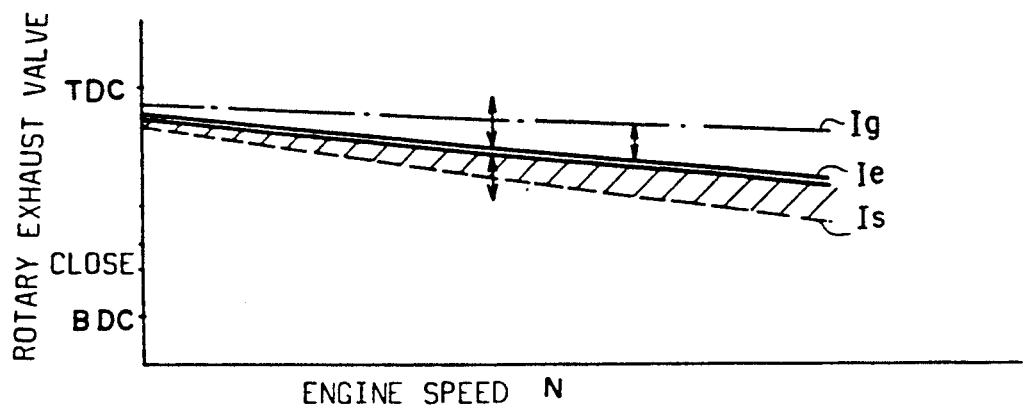
FIGS. 11a and 11b are graphs showing the fuel injection timing at light and heavy engine load ranges, respectively.

As shown in FIG. 11a, the fuel is injected from the injector at a predetermined time before the ignition at the later stage of the compression stroke in the engine operating conditions.

Figure 11B:
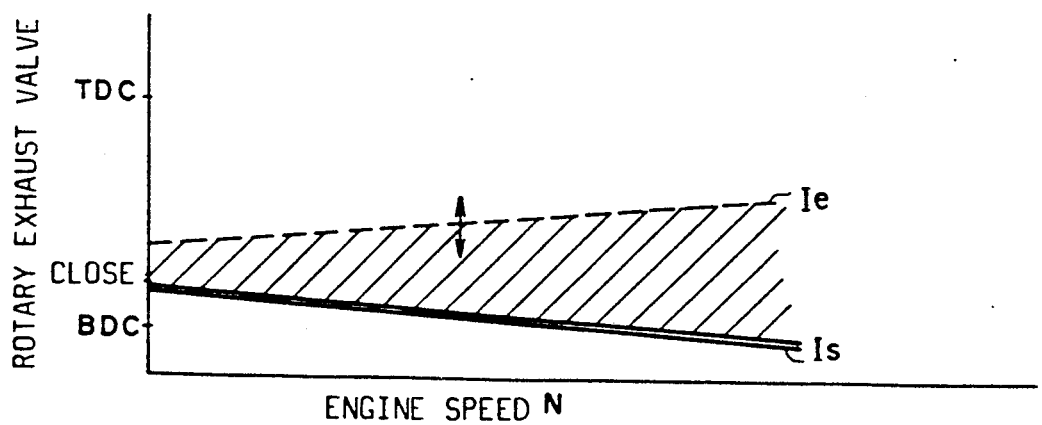

When $\phi \geq \phi_0$, the heavy engine load mode is determined in the heavy engine load mode determining section 39. The fuel injection timing is controlled in the section 41 in accordance with the injection timing table 42 having a characteristic as shown in FIG. 11b. As the depressing degree $\phi$ increases, the quantity of the fresh air forced into the cylinder 2 increases with closing the control valve 33. Thus, the engine load is controlled with the quantity of the mixture. Namely, output signals of the fuel injection starting angle Is and injection pulse width Ti are applied to the injector 6 before the rotary valve 18 closes. As shown in FIG. 11b, the fuel is injected immediately before the rotary valve 18 closes and the fuel spray is dispersed in the cylinder in all directions.

Although the present invention is described about the embodiments applied to the two-stroke cycle engine, the present invention may be applied to the four-stroke cycle engine.

In accordance with the present invention, the injector and the gap of the spark plug are disposed along the axis of the cylinder at a predetermined distance so as to provide a charge stratification. The fuel is effectively burned in the stratified combustion mode without using splash at the piston crown and the wall of the cylinder. Further, the influence of cycle variation is avoided so that stable combustion is obtained in a wide range of the engine operation.

Since misfiring caused by the lean mixture and the remaining burned gas is prevented, combustion efficiency is improved at all engine operating conditions so as to improve driveability, fuel consumption and emission control.

The stratified combustion automatically transfers into homogeneous mixture combustion, thereby producing large engine power.

The charge stratification is properly controlled in accordance with spray characteristics, and timing and duration of the injection. The fuel is preferably ignited at a low velocity and proper diffusion of the fuel spray.

Since the injector and the gap of the spark plug are disposed on the top of the combustion chamber, combustion efficiency is improved.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a fuel injection control system for an internal combustion engine having a cylinder, a piston reciprocating in said cylinder, a fuel injector provided at a top of said cylinder for injecting fuel directly into said cylinder, and a spark plug provided below said fuel injector for igniting said fuel, said spark plug forming a gap, the improvement in the system which comprises:

injection timing determining means for setting a fuel injection finishing timing at an advance angle corresponding to an arrival time of said fuel at said gap;

said injection timing determining means further for setting a fuel injection starting timing in dependency on said fuel injection finishing timing in accordance with a quantity of said fuel;

said injector injects said fuel in said cylinder in a form of a cone; and wherein said arrival time is determined as a function of distance between said injector and said spark plug and speed of said fuel injected into said cylinder in accordance with operating conditions of said engine so as to form a stratified charge.

2. The system according to claim 1, wherein
   said arrival time is determined as said distance divided by said speed reduced by an operation time lag of the injector.

3. The system according to claim 1, wherein
   said advance angle corresponding to said arrival time is an angle in advance of an ignition angle by the product of said arrival time multiplied by engine speed and a predetermined fraction.

4. The system according to claim 1, wherein
   said fuel injection starting timing is calculated by subtracting from said fuel injection finishing timing an angle formed by the product of an injection pulse width multiplied by engine speed and a predetermined fraction.

5. The system according to claim 1, wherein
   said injector and said gap are located at a summit of a combustion chamber formed in the cylinder and a cylinder head.

* * * * *